March 26, 1946.  A. S. KING  2,397,147
MECHANICAL MOVEMENT
Filed July 31, 1944   2 Sheets-Sheet 1

INVENTOR.
Arthur S. King
BY
ATTORNEY.

INVENTOR.
Arthur S. King
BY
ATTORNEY.

Patented Mar. 26, 1946

2,397,147

UNITED STATES PATENT OFFICE 2,397,147

MECHANICAL MOVEMENT

Arthur S. King, Kansas City, Mo.

Application July 31, 1944, Serial No. 547,495

7 Claims. (Cl. 74—40)

This invention relates to structure for increasing the efficiency of engines and particularly that type of prime mover having a reciprocating piston, a main crank shaft, and conventional connecting rod, with which is associated the parts made to embody the present invention.

One of the main objects is to provide in an engine of the aforementioned character, means for increasing the efficiency thereof resulting from greater leverage due to the inclusion in the engine assembly of an auxiliary crank shaft, structure interconnecting the said auxiliary crank shaft and main crank shaft, to insure synchronized rotation, and a specially formed and disposed link attached to the connecting rod of the engine to one side of the offset pins thereof beneath each piston.

Other objects of the invention include the specific details of construction about to be described by reference to the accompanying drawings, wherein.

Figure 1:
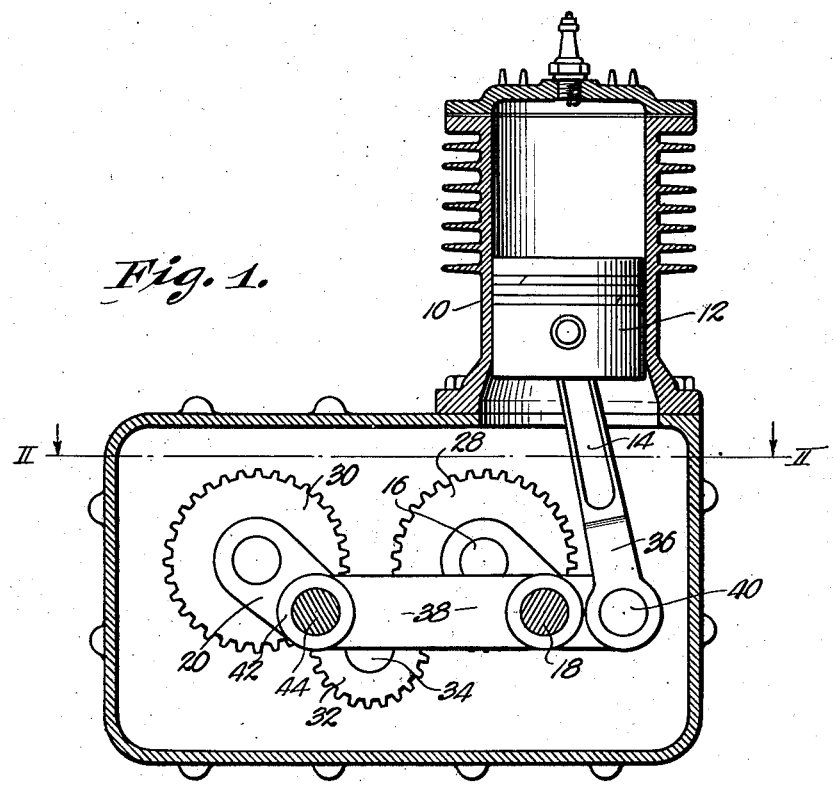
Fig. 1 is a vertical cross sectional view through an engine of the internal combustion type having means for increasing the efficiency, constructed in accordance with the present invention.
Figure 2:
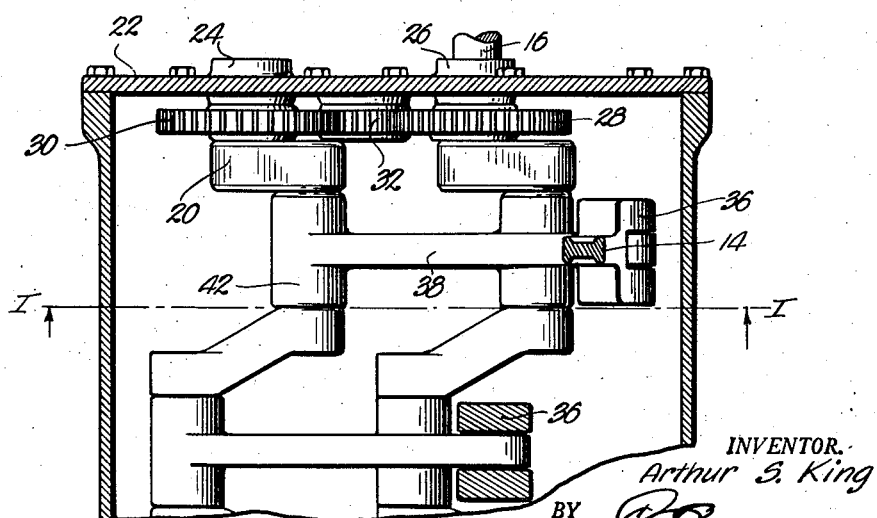
Fig. 2 is a sectional view taken on line II—II of Fig. 1.

The numeral 10 designates one cylinder of a conventional internal combustion engine, while 12 indicates the piston reciprocably mounted in the cylinder to actuate a connection rod 14, specially joined to main crank shaft 16. Crank shaft 16 is of conventional type in that it is equipped with offset pins 18 to one side of the main longitudinal axis.

An auxiliary crank shaft 20, identical with crank shaft 16, is supplied when an engine embodying means for increasing the efficiency thereof is to be constructed. The crank case 22 houses both the main crank shaft 16 and the auxiliary crank shaft 20 and bearings 24 and 26 journal these crank shafts 20 and 16 respectively.

Structure interconnecting the two crank shafts 16 and 20 is here shown to be a train of gears capable of insuring synchronized rotation during operation. Gear 28 is secured to crank shaft 16 and gear 30 is secured to crank shaft 20. An idler pinion 32 in mesh with both gears 28 and 30 is rotatably mounted upon a stub shaft 34 on one wall of crank case 22.

Connecting rod 14 is bifurcated as at 36 to straddle one end of the specially formed link 38. This link is straight and joined at its one end to connecting rod 14 through the medium of a pin 40. The other end of link 38 is in the form of a bearing 42 which journals offset pin 44 of the auxiliary crank shaft 20. The distance between the ends of pin 44 is, therefore, great enough to allow clearance as is the case with respect to pin 18.

Pin 18 is joined to link 38 intermediate its ends and the added leverage defined by the distance between the center of pin 18 and pin 40, is the factor governing the amount of increased efficiency when the two aforesaid crank shafts are in parallelism with their axes in a plane substantially perpendicular to the plane of the path of travel of piston 12.

Figure 3:
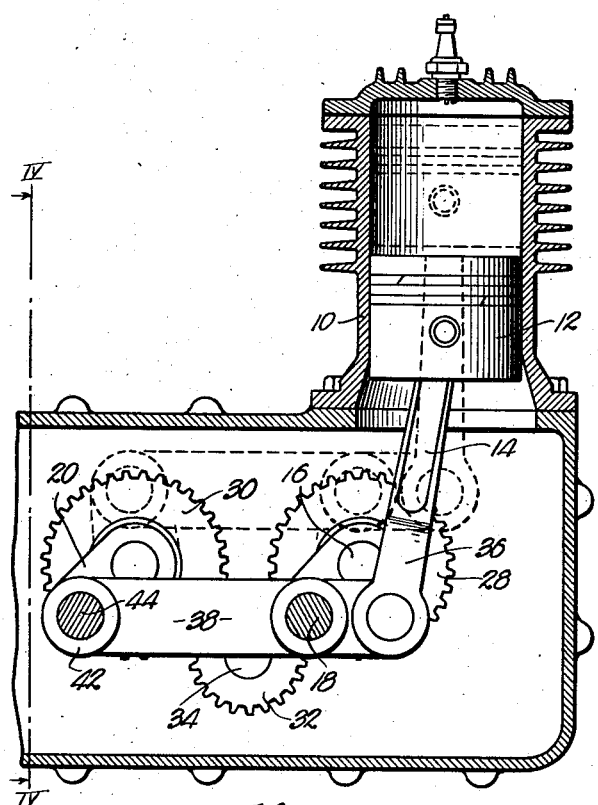
Fig. 3 is a sectional view similar to Fig. 1 with the auxiliary parts of the engine in a different position.
Figure 4:
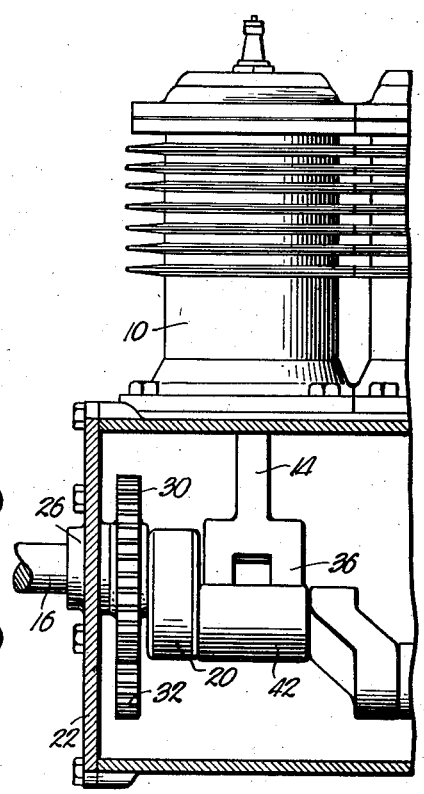
Fig. 4 is a sectional view taken on line IV—IV of Fig. 3.

Three distinct positions of link 38 are shown in Figs. 1 and 3. The piston 12 is at the upper end of its path of travel when in the dotted line position shown in Fig. 3. The lowermost position of piston 12 is shown in full lines of Figs. 1 and 3—thus the length of the path of travel of piston 12 is the same when link 38 is held, as illustrated and described, as though connecting rod 14 were attached directly to offset pin 18 of crank shaft 16. To insure full operating efficiency, the axis of crank shaft 16 is offset from the axis of piston 12 a distance equal to the distance between the centers of pins 18 and 40.

Figure 5:
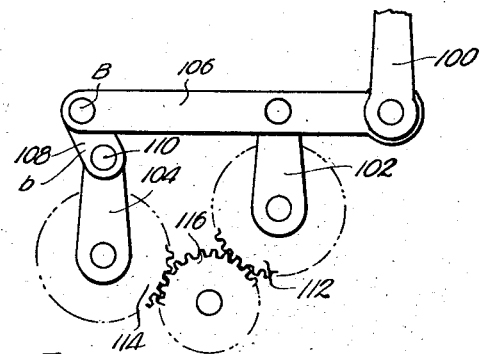
Fig. 5 is a schematic view illustrating a modified form of the invention wherein is included a plurality of links joining the main and auxiliary crank shafts in lieu of the single link illustrated in Figs. 1 to 4 inclusive.

The illustrated embodiment of the invention diagrammatically shown in Fig. 5, indicates that an advantage is gained when the linkage between connecting rod 100, crank shaft 102, and auxiliary crank shaft 104 is in the form of two links. The longer link 106 has connection with connecting rod 100 at its one end, while the other end of long link 106 is joined to a shorter link 108. This shorter link has connection with the offset pin 110 of auxiliary crank shaft 104 and the distances between the points of connection are such as to cause point of connection between long link 106 and short link 108, to lag behind the point of connection between the shorter link 108 and the offset pin 110 of auxiliary crank shaft 104.

The major axes of crank shafts 102 and 104 are vertically offset a distance equal to the length of short link 108 when this form of the invention is followed, but gears 112 and 114 on crank shafts 102 and 104 respectively, serve with pinion 116, to synchronize the rotary motion of the two crank shafts. The downward force exerted by the piston (not here shown), on connecting rod 100, is multiplied and movement is started with a relatively small force when the double linkage, just described, is employed.

Experimentation has proven the utility of both forms of the invention shown and described, and while there seems to be no explanation, so far as leverage formulae are concerned, it is known and has been proven that the efficiency of the engine is increased when parts as disclosed are used.

Having thus described the invention, what is claimed as new and desired to be secured by Letters Patent is:

1. In an engine having a crank shaft, including offset pins, reciprocating pistons and a connecting rod for each piston; an auxiliary crank shaft having offset pins of like throw characteristics as the crank shaft of the engine and disposed in parallelism thereto; structure interconnecting the crank shaft and the auxiliary crank shaft to insure synchronized rotation thereof in the same direction; and a link joining opposed offset pins of the first mentioned crank shaft, the auxiliary crank shaft and the connecting rod of one of the pistons, said link being of fixed length.

2. In an engine having a crank shaft, including offset pins, reciprocating pistons and a connecting rod for each piston; an auxiliary crank shaft having offset pins of like throw characteristics as the crank shaft of the engine and disposed in parallelism thereto; structure interconnecting the crank shaft and the auxiliary crank shaft to insure synchronized rotation thereof in the same direction; and a link joining opposed offset pins of the first mentioned crank shaft, the auxiliary crank shaft and the connecting rod of one of the pistons, said link being of fixed length, said link being longer than the distance between the offset pins of the crank shafts to which it is connected and having the connecting rod joined to one end thereof, the auxiliary crank shaft being joined to the opposite end thereof and said crank shaft of the engine being joined to the link at a point intermediate its end.

3. In an engine having a crank shaft, including offset pins, reciprocating pistons and a connecting rod for each piston; an auxiliary crank shaft having offset pins of like throw characteristics as the crank shaft of the engine and disposed in parallelism thereto; structure interconnecting the crank shaft and the auxiliary crank shaft to insure synchronized rotation thereof in the same direction; and a link joining opposed offset pins of the first mentioned crank shaft, the auxiliary crank shaft and the connecting rod of one of the pistons, said link being of fixed length longer than the distance between the offset pins of the crank shafts to which it is connected and having the connecting rod joined to one end thereof, the auxiliary crank shaft being joined to the opposite end thereof and said crank shaft of the engine being joined to the link at a point intermediate its ends, said link being straight and disposed to maintain a position substantially perpendicular to the path of travel of the piston as the crank shafts are rotated.

4. In an engine having a crank shaft, including offset pins, reciprocating pistons and a connecting rod for each piston; an auxiliary crank shaft having offset pins of like throw characteristics as the crank shaft of the engine and disposed in parallelism thereto; structure interconnecting the crank shaft and the auxiliary crank shaft to insure synchronized rotation thereof in the same direction; and a link joining opposed offset pins of the first mentioned crank shaft, the auxiliary crank shaft and the connecting rod of one of the pistons, said link being of fixed length longer than the distance between the offset pins of the crank shafts to which it is connected and having the connecting rod joined to one end thereof, the auxiliary crank shaft being joined to the opposite end thereof and said crank shaft of the engine being joined to the link at a point intermediate its ends, said link being straight and disposed to maintain a position perpendicular to the path of travel of the piston as the crank shafts are rotated, the axis of the piston being to one side of a vertical plane passing longitudinally through the axis of rotation of the crank shaft a distance substantially the same as the distance between the points of connection between the said link and the crank shaft of the engine and the connecting rod.

5. In an engine having a crank shaft including offset pins, reciprocating pistons and a connecting rod for each piston; an auxiliary crank shaft having offset pins of like throw characteristics as the crank shaft of the engine and disposed in parallelism thereto; structure interconnecting the crank shaft and the auxiliary crank shaft to insure synchronized rotation thereof in the same direction; and a link joining opposed offset pins of the first mentioned crank shaft, the auxiliary crank shaft and the connecting rod of one of the pistons, said interconnecting structure comprising gears of like diameters on the engine crank shaft and the auxiliary crank shaft, and an idler pinion in mesh with said gears.

6. In an engine having a crank shaft, including offset pins, reciprocating pistons and a connecting rod for each piston; an auxiliary crank shaft having offset pins of like throw characteristics as the crank shaft of the engine and disposed in parallelism thereto; structure interconnecting the crank shaft and the auxiliary crank shaft to insure synchronized rotation thereof in the same direction; and a pair of articulated links joining opposed offset pins of the first mentioned crank shaft and the auxiliary crank shaft, one of said links being relatively short and interconnecting one end of the longer link of the pair thereof and the offset pin of the auxiliary crank shaft, the other end of the longer link being joined to the connecting rod of one of the pistons, the offset pin of the crank shaft of the engine having its offset pin joined to the said longer link intermediate the ends thereof.

7. In an engine having a crank shaft, including offset pins, reciprocating pistons and a connecting rod for each piston; an auxiliary crank shaft having offset pins of like throw characteristics as the crank shaft of the engine and disposed in parallelism thereto; structure interconnecting the crank shaft and the auxiliary crank shaft to insure synchronized rotation thereof in the same direction; and a pair of articulated links joining opposed offset pins of the first mentioned crank shaft and the auxiliary crank shaft, one of said links being relatively short and interconnecting one end of the longer link of the pair thereof and the offset pin of the auxiliary crank shaft, the other end of the longer link being joined to the connecting rod of one of the pistons, the offset pin of the crank shaft of the engine having its offset pin joined to the said longer link intermediate the ends thereof, said crank shafts being offset vertically a distance slightly less than the length of the said shorter link, and the throw of the auxiliary crank shaft, the distance between the points of connection between the engine crank shaft pin and the longer link and the shorter link and said longer link being greater than the distance between the axes of said crank shafts, whereby to cause the point of connection between the said longer link and said shorter link to lag behind the point of connection between the shorter link and the offset pin of the auxiliary crank shaft.

ARTHUR S. KING.